United States Patent
Hamaguchi et al.

(10) Patent No.: US 12,254,695 B2
(45) Date of Patent: Mar. 18, 2025

(54) FOREIGN MATTER DETECTION SYSTEM

(71) Applicant: IHI CORPORATION, Tokyo (JP)

(72) Inventors: Kenichi Hamaguchi, Tokyo (JP); Hiroaki Imaizumi, Tokyo (JP); Jingyu Hu, Tokyo (JP); Takanori Nishimura, Tokyo (JP); Kenichi Nakamura, Tokyo (JP)

(73) Assignee: IHI Corporation, Tokyo (JP)

( * ) Notice: Subject to any disclaimer, the term of this patent is extended or adjusted under 35 U.S.C. 154(b) by 49 days.

(21) Appl. No.: 17/528,850

(22) Filed: Nov. 17, 2021

(65) Prior Publication Data

US 2022/0076029 A1  Mar. 10, 2022

Related U.S. Application Data

(63) Continuation of application No. PCT/JP2020/015074, filed on Apr. 1, 2020.

(30) Foreign Application Priority Data

May 20, 2019 (JP) ................. 2019-094737

(51) Int. Cl.
*H04N 7/18* (2006.01)
*G06V 10/147* (2022.01)
*G06V 20/52* (2022.01)
*G08B 21/18* (2006.01)

(52) U.S. Cl.
CPC ............ *G06V 20/52* (2022.01); *G06V 10/147* (2022.01); *G08B 21/18* (2013.01); *H04N 7/183* (2013.01)

(58) Field of Classification Search
CPC ...... G06B 20/52; G06B 10/147; G08B 21/18; H04N 7/183
See application file for complete search history.

(56) References Cited

U.S. PATENT DOCUMENTS

| 2008/0055880 A1* | 3/2008 | Williams ............... G03B 15/02 |
| | | 362/311.06 |
| 2016/0292865 A1* | 10/2016 | Floor ..................... G06V 20/42 |
| 2017/0108873 A1 | 4/2017 | Tanaka et al. |

(Continued)

FOREIGN PATENT DOCUMENTS

| JP | 62-194366 A | 8/1987 |
| JP | 08-042184 A | 2/1996 |
| JP | 2000-182195 A | 6/2000 |

(Continued)

OTHER PUBLICATIONS

International Search Report issued in Application No. PCT/JP2020/015074, dated Jun. 9, 2020, 2 pages.

*Primary Examiner* — Jonathan R Messmore
(74) *Attorney, Agent, or Firm* — Rothwell, Figg, Ernst & Manbeck, P.C.

(57) ABSTRACT

Provided are an image capturing device for capturing an image in a target area, transmission parts through which an outside can be visually observed from inside of the target area and polarizing filters on an light path from the transmission parts to the image capturing device. The front- and depth-side polarizing filters relative to the image capturing device are arranged so as to have polarizing directions crossing each other. A foreign matter in the target area is detected on the basis of the image acquired by the image capturing device.

11 Claims, 6 Drawing Sheets

(56) References Cited

U.S. PATENT DOCUMENTS

2018/0268246 A1* 9/2018 Kondo .................. G06V 10/75
2018/0349709 A1* 12/2018 Shinohara .............. G06V 20/52

FOREIGN PATENT DOCUMENTS

| | | |
|---|---|---|
| JP | 2002-213094 A | 7/2002 |
| JP | 2008-195495 A | 8/2008 |
| JP | 2012-158968 A | 8/2012 |
| JP | 2012-251306 A | 12/2012 |
| JP | 2014-080735 A | 5/2014 |
| JP | 2015-055073 A | 3/2015 |
| JP | 2016-003493 A | 1/2016 |
| JP | 2017-076266 A | 4/2017 |
| JP | 6330095 B1 | 5/2018 |
| JP | 2018-207222 A | 12/2018 |
| JP | 2019-68213 A | 4/2019 |

* cited by examiner

FOREIGN MATTER DETECTION SYSTEM

CROSS REFERENCE TO RELATED APPLICATIONS

The present application is a continuation of International Application No. PCT/JP2020/015074, filed on Apr. 1, 2020, which claims priority to Japanese Patent Application No. 2019-094737, filed on May 20, 2019, all of which are incorporated by reference herein in their entireties.

TECHNICAL FIELD

The present disclosure relates to a detection system of a foreign matter or matters present in a target area of, for example, a parking facility.

BACKGROUND ART

Non-presence of a foreign matter or matters such as a driver, an occupant or hand baggage other than a vehicle in a space into and in which the vehicle is entered and stopped such as an entry/exit space of a mechanical parking facility is required to be confirmed when an operation is to be executed such as opening/closing of a door for a doorway or conveyance of a pallet on which the vehicle is loaded. The non-presence of the foreign matter or matters may be visually confirmed by the driver, an attendant of the facility or the like. However, such reliance only on human power may result in halfway confirmation due to carelessness or the like. Thus, recently desired is a technique for automatically detecting non-presence of a foreign matter or matters with certainty without reliance only on human power.

It is assumable that, if automated driving techniques having been developed nowadays in many countries are turned into actual and full-fledged utilization, not only driving of a vehicle but also various operations as mentioned in the above around the vehicle such as the opening/closing of the door and the conveyance of the pallet will have progressed automation. For example, presumable is a case where a vehicle having escorted an occupant or occupants to a destination with automated driving is automatically moved to a neighboring mechanical parking facility and stored in a storing space therein. In this case, the vehicle is moved to and stopped in an entry/exit space with the occupants being absent; operations such as opening/closing of the door and started conveyance of the pallet may be executed by an attendant who has confirmed non-presence of a foreign matter or matters to input operation buttons. Nonetheless, the operations are executed more smoothly if there is a mechanism for automatically confirming non-presence of the foreign matter or matters to begin the operations.

Such mechanism for detection of a foreign matter or matters may be widely required not only in a mechanical parking facility but also in any locations with some operations being executed around a stopped vehicle such as a power feeding facility for an electric-powered vehicle. Moreover, a similar mechanism is widely applicable not only for a vehicle but also for any aspect where detection of a foreign matter or matters is required around a body or object.

As techniques for automatically detecting a foreign matter or matters in a target area, various methods have been proposed which use a camera or the like to acquire an image in the target area and detect the foreign matter or matters reflected in the image. Literatures relevant to such techniques are, for example, below-mentioned Patent Literatures 1-7.

CITATION LIST

Patent Literatures

Patent Literature 1: JP2016003493A
Patent Literature 2: JP2015055073A
Patent Literature 3: JP2014080735A
Patent Literature 4: JPH0842184A
Patent Literature 5: JPS62194366A
Patent Literature 6: JP2012158968A
Patent Literature 7: JP2000182195A

SUMMARY

Technical Problems

In the foreign matter detection techniques as mentioned in the above, of course, minimal accuracy is required. In addition, important is to make mechanical components as simple as possible from a viewpoint of construction or maintenance cost and the like. However, any of the techniques as disclosed in the above-mentioned Patent Literatures 1-7 does not necessarily provide sufficient satisfaction both in accuracy and in cost.

Thus, described in the disclosure is a foreign matter detection system capable of detecting a foreign matter or matters with higher accuracy by extremely simple construction.

Solution to Problems

The present disclosure is directed to a foreign matter detection system comprising an image capturing device for acquiring an image in a target area, a transmission part through which an outside can be visually observed from inside of the target area and front- and depth-side polarizing filters relative to the image capturing device, the polarizing filters being provided on an light path from the transmission part to the image capturing device so as to have polarizing directions crossing each other, whereby a foreign matter in the target area is detected on the basis of the image acquired by the image capturing device.

In the above-mentioned foreign matter detection system, the depth-side polarizing filter may be provided on the transmission part positioned on a border between the target area and an outer space.

In the above-mentioned foreign matter detection system, the foreign matter in the image acquired by the image capturing device may be detected by a program using deep learning.

In the above-mentioned foreign matter detection system, the target area may be an entry/exit space in a mechanical parking facility.

The present disclosure is also directed to a foreign matter detection system comprising an image capturing device for acquiring an image in a target area, a display part for display of the image acquired by the image capturing device, an operation part for input of operations of parts constituting the system and a foreign matter detection part for detection of a foreign matter in the target area, whereby the image acquired by the image capturing device is displayed on the display part together with information on the foreign matter detected when presence of the foreign matter is determined by the foreign matter detection part.

In the above-mentioned foreign matter detection system, an operator may confirm non-presence of the foreign matter in the target area to input the non-presence of the foreign matter to the operation part when presence of the foreign matter is determined by the foreign matter detection part.

In the above-mentioned foreign matter detection system, operations of devices constituting the system may be forbidden when the presence of the foreign matter is determined by the foreign matter detection part and thereafter a forbidden operation state of the devices constituting the system may be released when the non-presence of the foreign matter is inputted to the operation part.

Effect

A foreign matter detection system according to the invention can exhibit an excellent effect that a foreign matter or matters can be detected with higher accuracy by extremely simple construction.

DESCRIPTION OF EMBODIMENT

An embodiment in the disclosure will be described in conjunction with attached drawings. In a foreign matter detection system according to the embodiment shown in FIG. 1, a target area A assumed is an entry/exit space in a mechanical parking facility. Any object (foreign matter F) other than the vehicle 1 and present in the target area A is detected as the foreign matter F. The entry/exit space as the target area A is a space defined by walls in four directions into and from which the vehicle 1 is entered/exited through an entry/exit port 3 on a front side (a lower side in the figure). On a right side of the stopped position of the vehicle 1 is a space in which a conveying device 5 is installed. Upon entering/exiting of the vehicle 1, the pallet 2 is entered/exited into/out of the target area A through a conveyance port (not shown) by the conveying device 5. A home position of the pallet 2 in the target area A is a center of the target area A.

Figure 2:
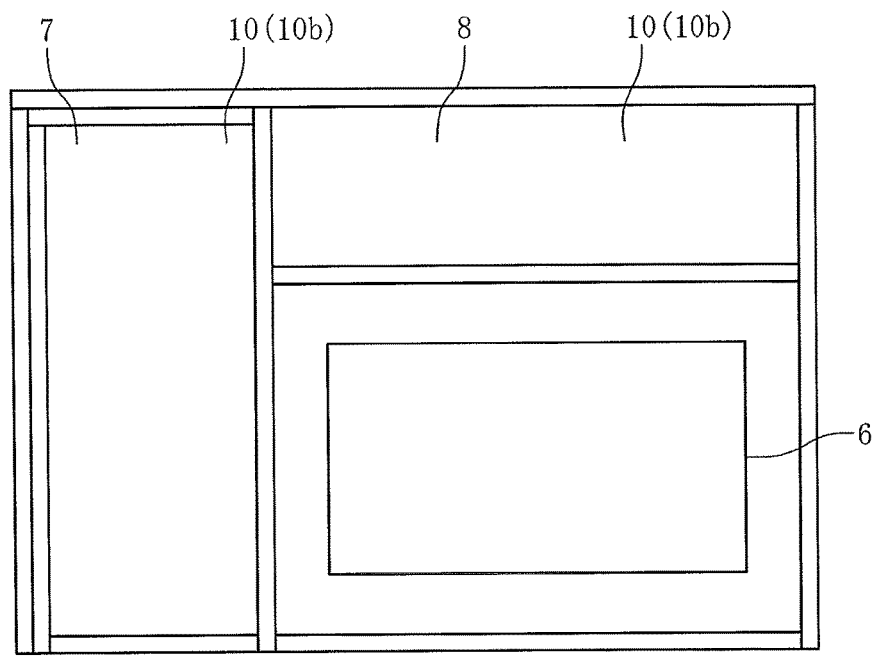
FIG. 2 is a front view for brief explanation of a neighborhood of a doorway and window in the embodiment according to the disclosure.

Arranged on a depth-side wall, viewed from the entry/exit port 3, is a guide mirror 6 as shown in FIG. 2 which is in front of the vehicle 1 stopped on the pallet 2 so as to assist an eyesight of the driver in the vehicle 1 upon entering/exiting thereof. Arranged on a position laterally of the depth-side guide mirror 6 viewed from the entry/exit port 3 is a doorway 7 for entering/exiting of a person such as the driver, an occupant or an attendant in the facility.

A door in the doorway 7 is made from glass or other light-transmissive material so that the inside may be visually observed from outside of the doorway 7. Arranged above the guide mirror 6 is a window 8.

In the specification, an optical opening through which the outside can be visually observed from the inside of the target area is called as "transmission part". In the embodiment, the doorway 7 and window 8 correspond to transmission parts; in addition, for example, a barred or railed part which borders an adjoining space is assumable as "transmission part". Further, the entry/exit port 3 may be also defined as "transmission part" (however, as mentioned hereinafter, one of main features in the foreign matter detection system explained in the disclosure is provision of polarizing filters 10 for the transmission parts. Though callable as "transmission part", the entry/exit port 3 is an opening for entering/exiting of the vehicle 1 and is not suited for the provision of the polarizing filter 10 thereon unlike the doorway 7 and window 8).

In the specification, the "foreign matter" is an object other than a target (in this case, the vehicle 1 is the target to be conveyed) present in the target area, is other than objects originally arranged in the target area and is typically the driver of the vehicle, an occupant or an attendant in the facility. Hand luggage or the like carried into the target area A and laid outside of the vehicle 1 is also an example of the "foreign matter". Exemplarily shown in FIG. 1 are one foreign matter F in the target area A and two objects O outside of the target area A.

A camera or other image capturing device 9 is arranged in the target area A for acquirement of an image in the target area A. In the embodiment, as shown in FIG. 1, totally three image capturing devices 9a-9c are arranged as image capturing devices 9 around the stopped position of the vehicle 1. The image capturing device 9a is arranged, when inside of the target area A is viewed from the entry/exit port 3, on a deeper side of the stopped position of the vehicle 1 and on one of lateral sides (on a right side in the case shown in the figure). The image capturing devices 9b and 9c are arranged forward of the vehicle 1 in the target area A and on lateral sides of the entry/exit port 3, respectively. Each of the image capturing devices 9 is arranged at a height near a ceiling of the target area A.

Figure 1:
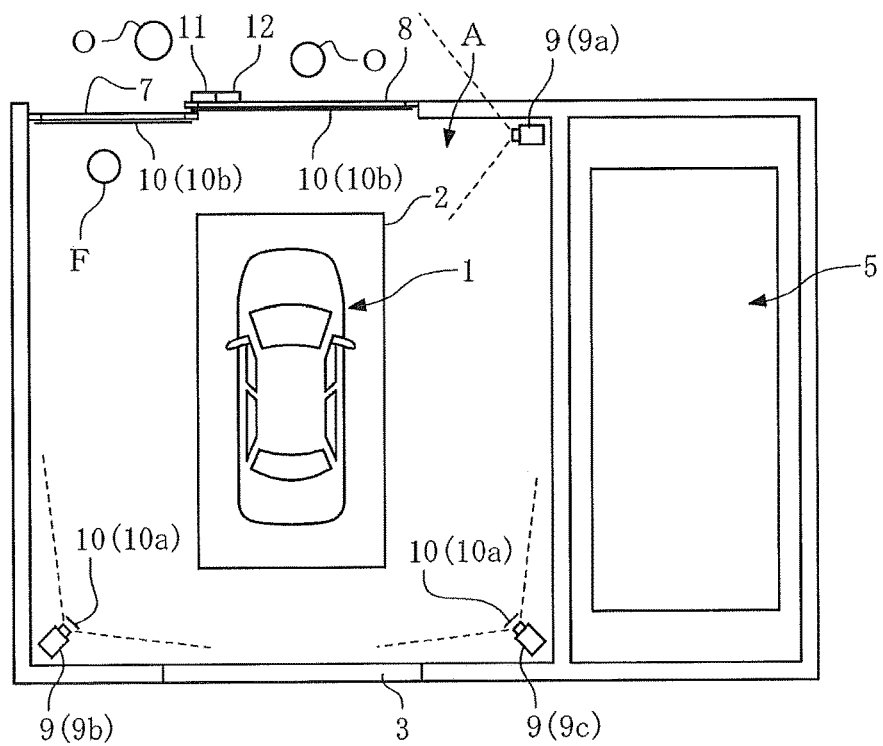
FIG. 1 is a schematic plan view for explanation of an arrangement of devices in a foreign matter detection system according to an embodiment in the disclosure.

Each of the image capturing devices 9a-9c has an angular field of the order of 90° as shown by dotted lines in FIG. 1. The image capturing device 9a on the deep side of the stopped position of the vehicle 1 viewed from the entry/exit port 3 and on the one of the lateral sides (on the right side) is arranged so as to put the other lateral-side (left-side) space within the angle field. The image capturing device 9b on the left side viewed from the entry/exit port 3 is arranged so as to put the space on the deep and right side of the target area A viewed from the image capturing device 9b. The image capturing device 9c on the right side viewed from the entry/exit port 3 is arranged so as to put the space on the deep and left side in the target area A within the field angle viewed from the image capturing device 9c.

Thus, the totally three image capturing devices 9 are arranged around the vehicle 1 as shield so as to acquire images in the target area A with no blind spots. Moreover, as mentioned hereinafter, the entry/exit port 3 is prevented as much as possible from being reflected within the field angles of the image capturing devices 9.

The image capturing devices 9b and 9c on the front side viewed from the entry/exit port 3 are arranged to be opposed to the doorway 7 and window 8 as the transmission parts so as to put the doorway 7 and window 8 within the field angles thereof. And each of the image capturing devices 9b and 9c, the doorway 7 and the window 8 is provided with a polarizing filter 10 so as not to reflect outer images through the doorway 7 and window 8 in the images acquired by the image capturing devices 9b and 9c. Meritorious effect of the polarizing filters 10 will be detailedly explained hereinafter.

Arranged on a wall near the doorway 7 are an operation and display parts 11 and 12. The operation part 11 is an input device for inputting operations of system components such as opening/closing of the entry/exit port 3 and conveyance of the pallet 2. The display part 12 is a display constituted to display the image in the target area A acquired by the image capturing device 9 as needs demand. The display part 12 also serves to give an alarm when some affair on which attention is to be drawn to personnel occurs in the target area A or anywhere in the facility including the target area A. The "some affair on which attention is to be drawn to personnel" is, for example, detection of a foreign matter F other than the vehicle 1 in the target area A upon conveyance of the vehicle 1 to a storing space outside of the target area A. A content of the alarm given by the display part 12 is, for example, indication of an alarm message; in addition, a separate device may be further arranged which has an alarm function capable of calling personnel's attention such as alarm sound or warning-lamp lighting.

A position on which the operation and display parts 11 and 12 are arranged is not restricted to the position disclosed here. Devices corresponding to them may be arranged in a control room (not shown) or the like and any of the devices may be arranged plurally and separately in separate locations. Arbitral changes are allowable on the operation and display parts 11 and 12 depending on layout of the target area A or other conditions.

Figure 3:
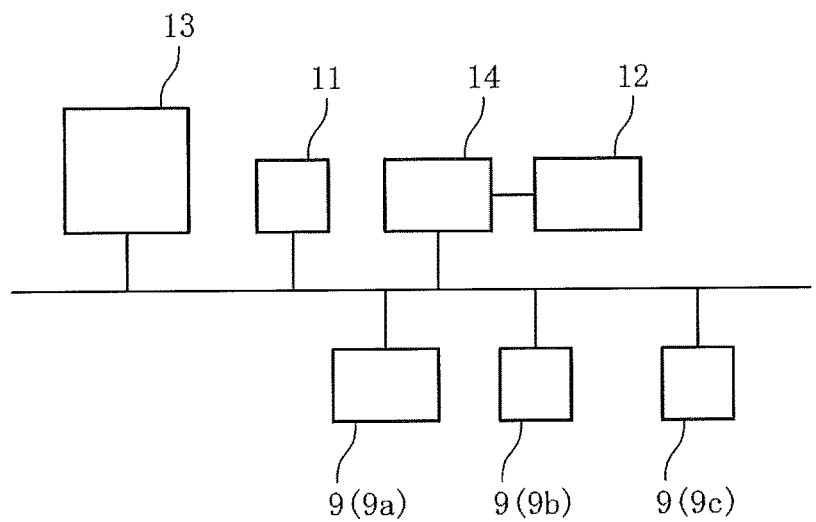
FIG. 3 is a block diagram for explanation of system construction in the foreign matter detection system according to the embodiment in the disclosure.

FIG. 3 shows an example of system construction concerning control of the image capturing devices 9, the operation part 11 and the display part 12. The image capturing devices 9 and the operation part 11 are informationally connected through a communication bus such as Ethernet (registered trademark) to a controller 13. The controller 13 is a device which monitors the whole of the mechanical parking facility including the entry/exit space as the target area A and operates the parts, and controls, for example, the opening/closing of the entry/exit port 3, the conveyance of the pallet 2 and actuation of the image capturing devices 9.

The display part 12 is connected through the foreign matter detection part 14 to the communication bus. The foreign matter detection part 14 is a part for detection of any foreign matter in the target area and is constituted, in the embodiment, as an information processing device which properly processes the images in the target area A acquired by the image capturing devices 9. The foreign matter detection part 14 transmits, as needs demand, the image data to the display part 12 to display the image on the display part 12.

The image processing by the foreign matter detection part 14 specifically assumed in the embodiment is to detect any foreign matter F (see FIG. 1); in the foreign matter detection part 14, the images in the target area A acquired by the image capturing devices 9 are analyzed to determine whether a person or other foreign matter F is present or not in the images. The controller 13 displays a message on the display part 12 as needed basis such as when the foreign matter F is detected from the images processed in the foreign matter detection part 14.

The foreign matter detection part 14 has therein a program for detection of the foreign matter F reflected in the images. The program is constituted to detect specific kinds of objects by way of a deep learning technique using a multi-layer neural network. Usable as algorithms for the deep learning are various kinds of algorithms such as R-CNN (Regional-Convolutional Neural Network), Fast R-CNN, Faster R-CNN, YOLO (You Only Look Once) and SSD (Single Shot Multi box Detector); any other proper algorithm may be also used.

Using such algorithm, the program stored in the foreign matter detection part 14 is adapted to specify a kind of the object reflected in the images and output a probability of the object being an object of the kind, a coordinate of gravity in the object, width and height of the object and the like. A primary kind of the foreign matter F assumed in the entry/exit space as the target area A in the mechanical parking facility is a person, so that the program stored in the foreign matter detection part 14 is to be constituted to discriminate at least a person in the image. Since various objects such as a pet or other animal, a bag and a baby buggy are assumable as other objects enterable together with the vehicle 1 into the target area A, the program may also detect these objects other than the person. It is further assumable that kinds of objects to be detected as foreign matters may differ if a kind of the target area in which the foreign matter detection system is installed differs. Thus, the program may be constituted to be detectable not only persons but also various kinds of objects assumable depending on the kind of the target area.

The polarizing filters 10 arranged for the image capturing devices 9 and the doorway 7 and window 8 as transmission parts will be described with respect to positions and meritorious effects thereof. In the embodiment, the image capturing devices 9b and 9c are arranged in positions opposite to the doorway 7 and window 8 and has the angular fields within which the doorway 7 and window 8 are imaged.

Figure 4:
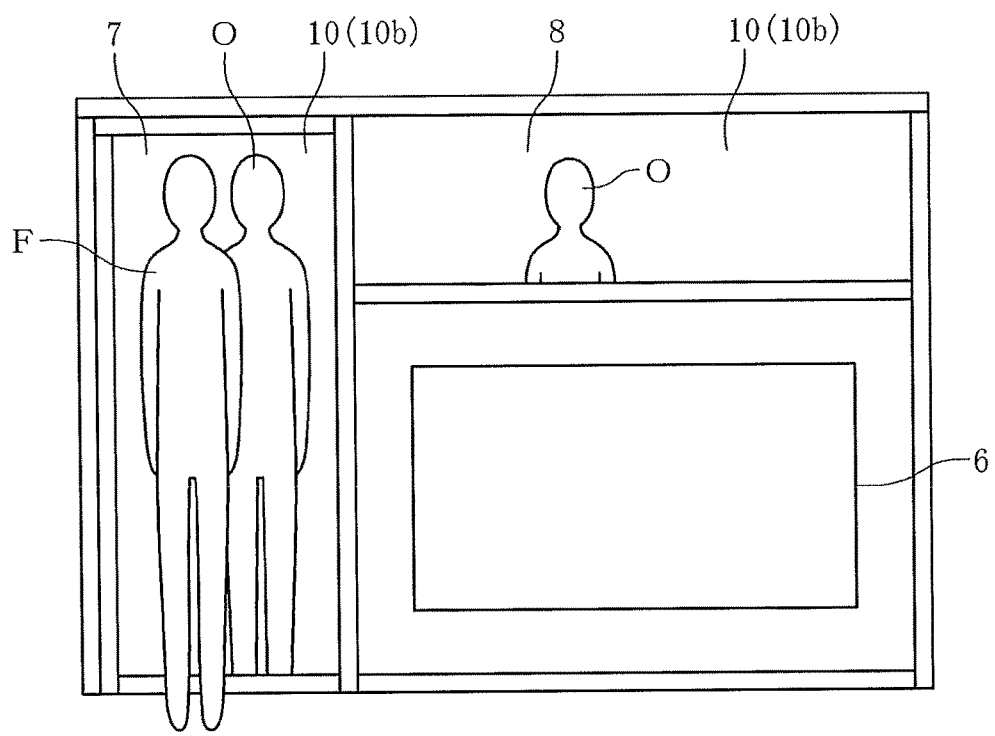
FIG. 4 is a front view schematically showing an example of a visually obtained image around the doorway and window.

As shown in FIG. 1, viewed from inside of the target area A, a foreign matter F is in front of the doorway 7 and two objects O are outside of the target area A and on deep sides of the doorway 7 and window 8; the doorway 7 and window 8 are visually observed as shown in FIG. 4 by bare eyes from inside of the target area A. If such image were acquired as they are by the image capturing devices 9b and 9c and the foreign matter detection were executed by the above-mentioned program in the foreign matter detection part 14, not only the foreign matter F in front of the doorway 7 and window 8 but also the objects O on the deep sides would be detected as the foreign matters. The detection of the foreign matter F within the target area A as the foreign matter has no problem; however, the detection of the objects O outside of the target area A is overdetection.

Figure 5:
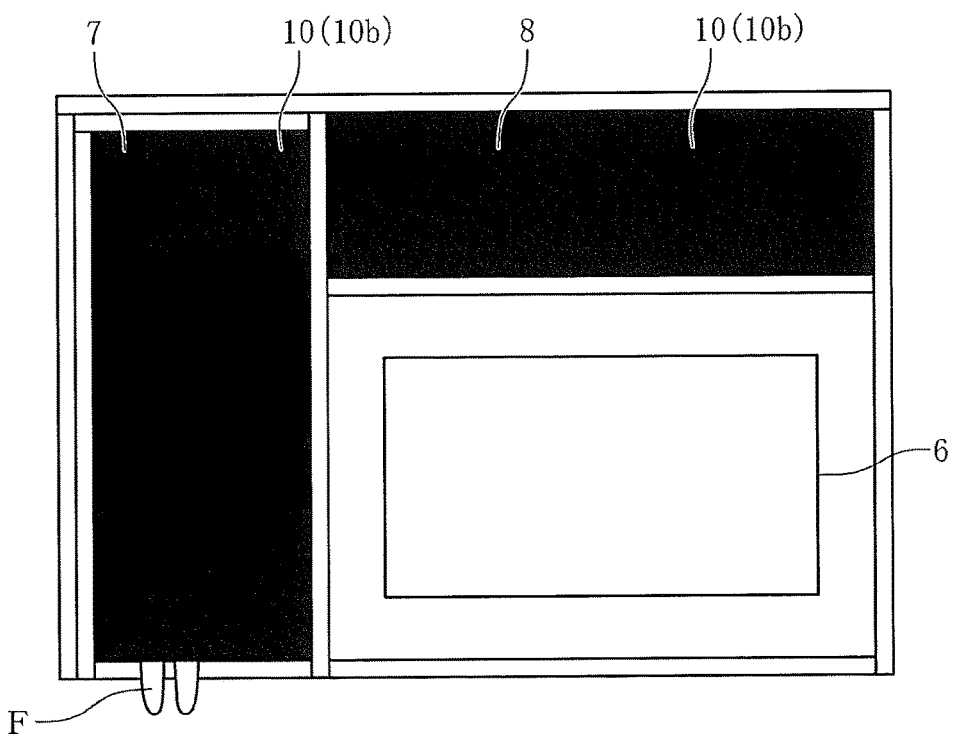
FIG. 5 is a view schematically showing a reference example of a masked image around the doorway and the window.

In order to prevent such overdetection, conceivable is a method for executing foreign matter detection by masking regions corresponding to the transmission parts (the doorway 7 and window 8) to be reflected in the image as shown in FIG. 5. However, in such method, there is a possibility that a portion of the foreign matter F in front of the entry/exit port 3 may be also masked, failing in detection irrespective of the presence of the foreign matter F in the target area A.

Other than the masking as shown in FIG. 5, it is possible to adopt various mechanisms to determine inside/outside of the target area A in the image (e.g., separate provision of a depth image sensor or introduction of a separate determination algorithm into the image processing operation). However, even if doing so, the outside/inside of the target area A are not always accurately determinable; disadvantageously, a separate cost may be involved for provision of sensors and the like, and calculation load on the foreign matter detection part 14 (see FIG. 3) may be increased.

Alternatively, though illustrations are omitted, conceivable is the image capturing devices 9 arranged in high positions in the target area A and directed downward to take image of the target area A from above so as to cover the whole of the target area A while outside of the target area A is excluded from the angular fields thereof. However, the entry/exit port of the mechanical parking facility is generally low in ceiling height so that it is difficult for the downwardly directed image capturing devices 9 to acquire a satisfactorily wide ranged image. Even if the image capturing devices 9 can be installed in adequate high positions, then caused is a problem that maintenance of the image capturing devices 9 must be executed in the high positions. Furthermore, any structure (such as a mechanism for conveyance of the pallet 2) positioned between a floor in the target area A and the arranged height of the image capturing devices 9 may become a shield, failing in imaging the whole of the target area A. From the viewpoint of detecting a person in the target area A as foreign matter F, there is also a problem that a personal image acquired from upward lacks in characteristic amount as person, resulting in difficulty in mechanical detection.

Thus, in the embodiment, each of the doorway 7 and window 8 as transmission parts and the image capturing devices 9b and 9c opposed thereto is provided with the polarizing filter 10 as shown in FIG. 1 to brock reaching of light from the outer space on the deep side of the doorway 7 and window 8 to the image capturing devices 9b and 9c. That is, on the light path from the doorway 7 and window 8 to the image capturing devices 9b and 9c, the polarizing filters 10 are arranged on the front and depth sides of the image capturing devices 9b and 9c, respectively, so as to make their polarizing directions cross each other, thereby masking a portion of the light from the doorway 7 and window 8 to the image capturing devices 9b and 9c. The front- and depth-side polarizing filters 10 may be arranged in proper positions on the light path from the transmission parts to the image capturing devices 9 depending on, for example, an actual spatial construction of the target area A; exemplified here is a case where the polarizing filters 10 are provided in front of the image capturing devices 9b and 9c and on the doorway 7 and window 8. Hereinafter, for the sake of explanation, the polarizing filters 10 shown in front of the image capturing devices 9b and 9c and on the doorway 7 and window 8 are called as front- and depth-side polarizing filters 10a and 10b, respectively, as needs demand.

The polarizing filters 10 are plate- or film-like articles which allow passing of polarized light only in a specific direction. In providing the polarizing filters 10 for the image capturing devices 9b and 9c and the doorway 7 and window 8, the polarizing filters 10 may be arranged to shield front sides of lenses in the image capturing devices 9b and 9c, and the film-like polarizing filters 10 may be attached to the doorway 7 and window 8 to cover the same. Alternatively, components or materials themselves of the image capturing devices 9b and 9c and the doorway 7 and window 8 (e.g., lenses or lens covers on the image capturing devices 9b and 9c or glass constituting the doorway 7 and window 8) may be provided by polarizing plates or the like.

In this way, the visibility is not blocked when someone visually observes outside/inside of the target area A through the doorway 7 and window 8. That is, as shown in FIG. 4, outside can be visually observed from inside of the target area A through the doorway 7 and window 8 and vice versa.

Figure 6:
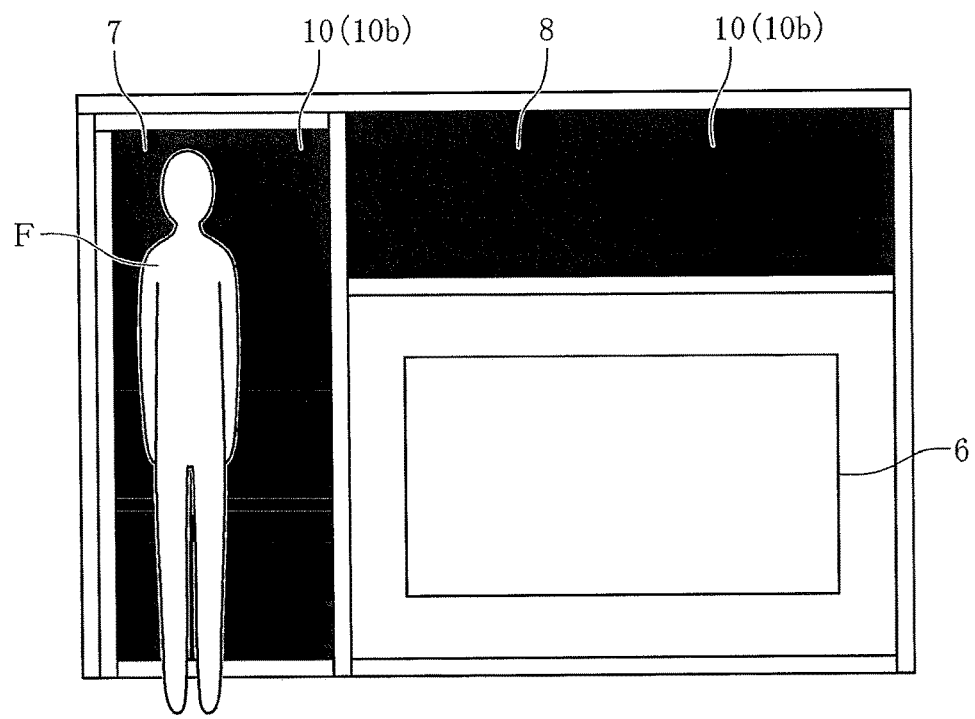
FIG. 6 is a view schematically showing an example of an image acquirable when polarizing filters are provided for the doorway, the window and the image capturing device.

Nevertheless, when an image in the target area A is to be acquired by the image capturing device 9b or 9c, light from the outer space through the doorway 7 and window 8 is blocked by the two polarizing filters 10 arranged on the light path. As a result, as shown in FIG. 6, acquired is an image as if it is painted out with black only outside of the doorway 7 and window 8. In such image, unlike the masking as shown in FIG. 5, the objects O on the deep sides of the doorway 7 and window 8 are masked while the foreign matter F in front of the doorway 7 and window 8 is not masked. Thus, if on the basis of the image thus acquired, the foreign matter detection is executed using the foreign matter detection part 14, presence/non-presence of the foreign matter F can be determined accurately without causing detection omission or overdetection.

In this respect, there is no necessity for the respective polarizing directions to cross each other strictly at right angles. It suffices that the light from the doorway 7 and window 8 to the image capturing devices 9b and 9c is blocked to an extent that the objects O on the deep sides of the doorway 7 and window 8 cannot be identified when the image with the doorway 7 and window 8 being reflected is acquired by the image capturing devices 9b and 9c and foreign matter detection is to be executed by the foreign matter detection part 14.

As mentioned in the above, the entry/exit port 3 which can be defined as "transmission part" just like the doorway 7 or the window 8 is hardly covered totally with a polarizing filter since the vehicle 1 is entered/exited therethrough. Thus, if the entry/exit port 3 is within the angular field of any of the image capturing devices 9 and a person or other object is present outside of the entry/exit port 3, there is a possibility that such outer object is detected as foreign matter.

In the embodiment, this problem is coped with by layout of the image capturing devices 9. Specifically, as mentioned in the above, the image capturing device 9a on the deep and right side viewed from the entry/exit port 3 is arranged so as to put the left-side space within the angular field; the image capturing devices 9b and 9c arranged on the front and left/right sides viewed from the entry/exit port 3 are arranged so as to put the right/left space within the angular field, respectively (see FIG. 1).

With the three image capturing devices 9 being arranged in this manner, the whole of the target area A can be put into the images without blind angles while the entry/exit port 3 may be outside of the angular fields of the respective image capturing devices 9 or may be on farthest edges of the angular fields, if any. Thus, the entry/exit port 3 is not reflected in each of the images acquired by the image capturing devices 9 or is reflected in a farthest edge thereof, if any. With the reflected position of the entry/exit port 3 being in the farthest edge of the image, there is little possibility for the foreign matter F positioned in the target area A to be masked to cause detection omission even if masking is executed in a region corresponding to the entry/exit port 3 in the image.

In this manner, in the embodiment, the transmission parts (the doorway 7 and window 8) opposing to the image capturing devices 9 have the polarizing filters 10 by which the light is physically masked, and the transmission part (entry/exit port 3) for which the polarizing filter 10 cannot be arranged is positioned as far as possible from the center of the angular field of the image capturing device 9. Thus, the foreign matter detection can be executed with higher accuracy through exclusion of possibilities of overdetection due to reflection in the image of any object outside of the transmission parts (the doorway 7 and window 8 and the entry/exit port 3) and of possibilities of detection omission due to masking or the like.

Since the guide mirror 6 reflects the light entering from outside through the entry/exit port 3, it is conceivable that any object outside of the entry/exit port 3 and reflected on the guide mirror 6 may be acquired as image by the image capturing devices 9b and 9c. However, even if the outer object enters in such a manner through the guide mirror 6 within the angular field of the image capturing devices 9b and 9c, given the size and shape of the object reflectable in the image, there is little probability of any object in the image being actually detected with a high degree of certainty by the foreign matter detection part 14.

Nevertheless, for example, if the guide mirror 6 is large enough, there is a fear that the refection of the image on the guide mirror 6 may lead to overdetection. In such a case, the guide mirror 6 may be separately provided with a polarizing filter to mask the light reflected on the guide mirror 6 to the image capturing devices 9b and 9c. As disclosed in the above, the foreign matter detection system disclosed in the specification resides in that two polarizing filters 10 are provided on the light path from the transmission parts 7 and 8 to the image capturing devices 9 to thereby acquire the image of the object in front of the depth-side polarizing filters 10b while the depth side is masked. As far as such effect can be obtained, the positions of the polarizing filters 10 may be arbitrarily changed. Though the polarizing filters 10 are arranged on the doorway 7 and window 8 in FIG. 1, a polarizing filter 10 may be arranged on the guide mirror 6 which is similarly on the light path. Alternatively, the polarizing filters 10 may be on any other positions; but, in fact, it seems convenient to provide the same on the doorway 7 or window 8 positioned on a border between the target area A and an outer space or on the guide mirror 6 which provides a reflective surface from outer light.

When the vehicle 1 is to be entered into the target area A which is the entry/exit space in the mechanical parking facility, a driver or an occupant of the vehicle 1 or an attendant in the facility operates the operation part 11 to instruct started entering. In accordance with the instructions, the controller 13 opens the entry/exit port 3. Upon the started entering, the entry/exit port 3 is opened with the pallet 2 empty being arranged in position in the center of the target area A.

After the entry/exit port 3 is opened, the driver moves the vehicle 1 into the target area A and stop the same on the pallet 2. In this case, the driver's visual sight is assisted by the guide mirror 6 so that the driver can stop the vehicle 1 in a proper position on the pallet 2. After the stoppage, the driver and other occupants get out from the vehicle and leave the target area A through the doorway 7. After the leaving of all of the driver and other occupants, the driver or the like visually observes inside of the target area A through the doorway 7 and confirms whether a person, hand luggage or other foreign matter or matters F are present in the target area A or not and operates the operation part 11 to input proper stoppage of the vehicle 1 on the pallet 2. The controller 13 closes the entry/exit port 3 to operate the conveying device 5 to thereby convey the pallet 2 with the vehicle 1 loaded thereon to a storage space outside of the target area A.

When the vehicle 1 is to be exited, the driver of the vehicle 1, the occupant, the attendant in the facility or the like operates the operation part 11 to instruct started exiting. In accordance with the instructions, the controller 13 conveys the corresponding pallet 2 into the target area A by means of the conveying device 5 and opens the entry/exit port 3. The driver enters through the doorway 7 into the target area A, gets in the vehicle 1 on the pallet 2 and moves the same through the entry/exit port 3 out of the target area A. After exiting of the vehicle 1 outside, the driver of the vehicle 1, the attendant or the like operates again the operation part 11 to input completed exiting. In this case, the operator operating the operation part 11 confirms non-presence of the foreign matter in the target area A through the doorway 7 or the window 8 as the transmission part and then inputs the completed exiting. In accordance with the instructions, the controller 13 closes the entry/exit port 3.

The above-mentioned series of operations are explained exemplarily on a case where the driver drives the vehicle 1. There may be also a case where the vehicle 1 is an automated driving car; then, a part or all of the above-mentioned movements of the vehicle 1 are executed not through the driver.

An example of a procedure for executing the foreign matter detection in the target area A as mentioned in the above will be described in conjunction with the flowchart shown in FIG. 7.

First of all, in step S1, whether a door of the doorway 7 is closed or not is confirmed with, for example, an opening/closing sensor (not shown) arranged on the doorway 7 (step S1). If the door is opened, the above-mentioned masking function by the polarizing filter 10 on the doorway 7 does not function well; thus, step S1 is repeated until the closing of the doorway 7 is confirmed; waiting continues until the closing of the doorway 7 is confirmed. In this case, a message for urging the closing of the doorway 7 may be displayed on the display part 12.

If the closing of the doorway 7 is confirmed, then the controller 13 actuates the respective image capturing devices 9 to acquire images in the target area A (step S2) After the images are acquired, the foreign matter detection part 14 executes the foreign matter detection processing, using the program, on the images acquired by the image capturing devices 9 (step S3).

In step S4, whether any foreign matter is present or not in the images is determined as a result of the foreign matter detection. If no foreign matter is present in any of the images acquired by the image capturing devices 9, non-presence confirmation of the foreign matter is completed (step S5) and the procedure of the foreign matter detection is ended. Operations are executed through the controller 13 to close the entry/exit port 3, convey the pallet 2 and the like.

If presence of any object of a kind to be assumed as foreign matter F (for example, a person) is determined in step S4 with regard to at least one of the images acquired in step S2, processing goes to step S11.

Figure 8:
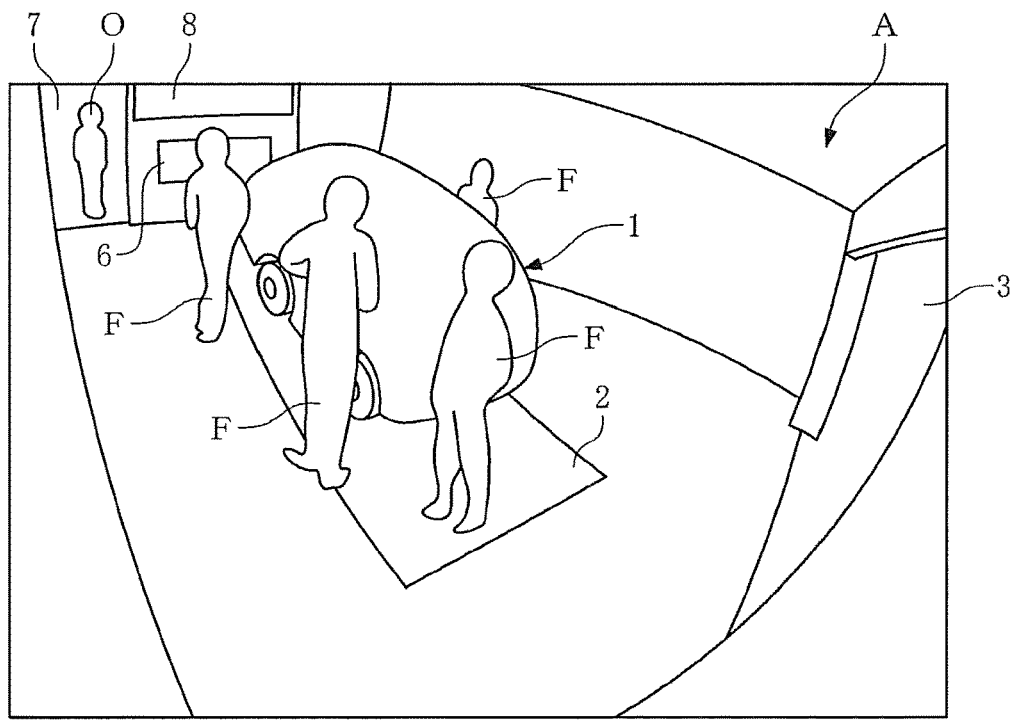
FIG. 8 is a view for explanation of a reference example of an image acquired by an image capturing device.

If the polarizing filters 10 were not provided for the doorway 7 and window 8 in a case where any foreign matter is present in the target area A, an image as shown in FIG. 8 would be acquired by, for example, the image capturing device 9b in step S2. In this case, in steps S3 and S4, there would be a fear that, in addition to the foreign matters F as persons within the target area A, an object O positioned on a deep side of the doorway 7 would be also detected as foreign matter.

Figure 9:
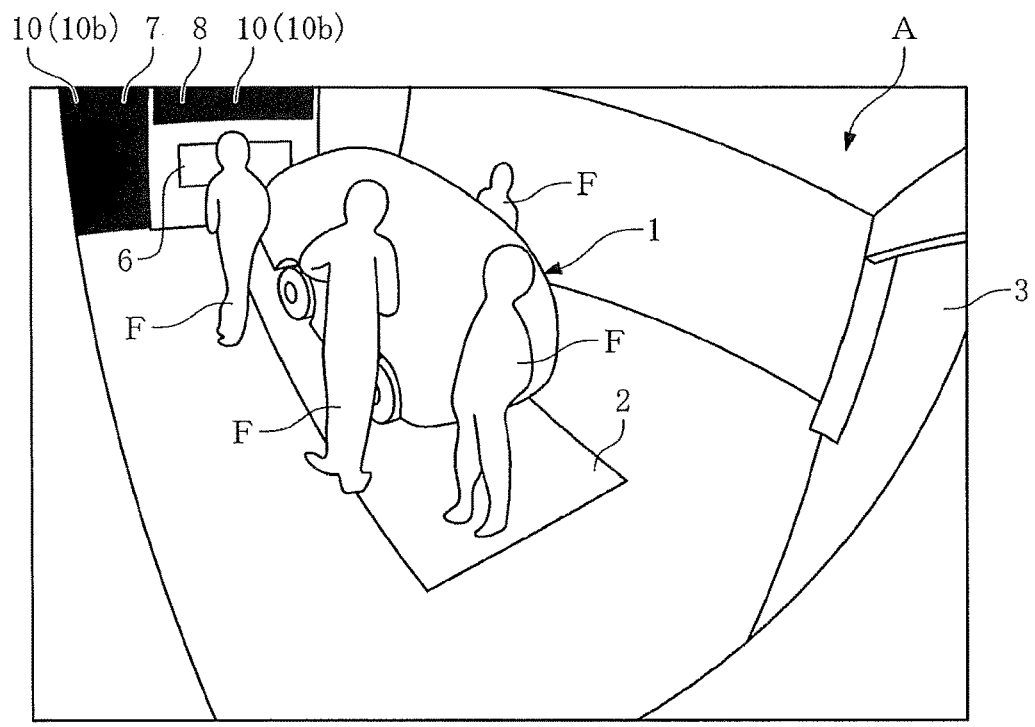
FIG. 9 is a view showing an example of an image acquired by the image capturing device according to the embodiment in the disclosure.

However, in the embodiment, the polarizing filters 10 are arranged for the image capturing devices 9b, the doorway 7 and the window 8 so that actually acquired in step S2 by the image capturing device 9b is an image as shown in FIG. 9. In this image, the deep sides of the doorway 7 and window 8 are masked by the polarizing filters 10 so that only the foreign matters F positioned on the front side within the target area A can be detected as foreign matters.

In step S11, operations on the devices (e.g., opening/closing of the entry/exit port 3 or conveyance of the pallet 2) are forbidden (interlock) as needs demand. Then, step S6 is executed. In step S6, a fact that the foreign matter is detected is displayed on the display part 12. In this case, a message by characters or by voice is issued or a background color of the display part 12 is changed so as to call attention to the operator (personnel such as the driver of the vehicle 1 or the attendant in the facility).

Displayed on the display part 12 is an image determined to include the foreign matter or matters among the images acquired by the image capturing devices 9. When there are a plurality of images determined to include the foreign matter or matters, display of all of such images on the display part 12 may bring about hardness to see. Therefore, only the image with the detected foreign matter or matters having a highest possibility of being a specific kind (here, person) may be displayed on the display part 12.

Figure 10:
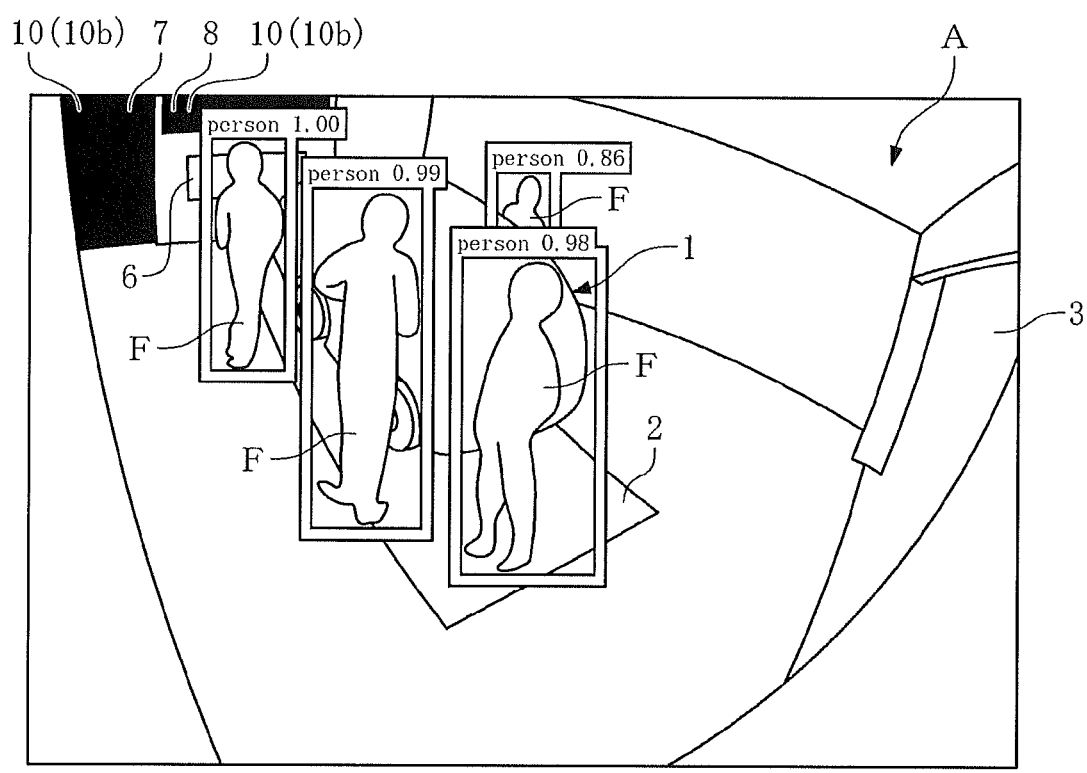
FIG. 10 is a view showing an example of the image displayed on a display part according to the embodiment in the disclosure.

The image displayed in step S6 may be superposition of results from the foreign matter detection as shown in FIG. 10. In the image shown, each of the objects detected as foreign matters is shown together with a surrounding frame to show the position of the object, the specified kind of the object (here, "person") and probability of the object being an object of the kind.

While referring to the image as shown in FIG. 10, the conformer visually observes the inside of the target area A through the doorway 7 or enters through the doorway 7 into the target area A to confirm whether the foreign matter is present or not (step S7). If the foreign matter F is present in the target area A as a result of the confirmation, a proper processing is executed into non-presence of the foreign matter F (steps S8-S9); if the foreign matter F is a person, his/her exit is called for and if it is an article, it is removed. After the foreign matter F becomes non-presence, confirmation of non-presence of the foreign matter F is inputted to the operation part 11 (step S10). After the input of the non-presence of the foreign matter F, the forbidden operation state of the devices is released (that is, the interlock done in step S11 is released) to make operations of the devices possible.

If, as a result of the confirmation in step S7, non-presence of the foreign matter in the target area is confirmed, the determination result in the previous step S4 is regarded to be false detection; for example, in the foreign matter detection through image recognition, there is a possibility that an illustration drawn on the vehicle 1 may be falsely detected as person. In such a case, it proceeds from step S8 to step S10 and confirmation of actual non-presence of the foreign matter is inputted. After the input in step S10 is executed, non-presence confirmation of the foreign matter is completed (step S5).

Thus, in the processing requiring non-presence confirmation of foreign matter through manpower, display of the image in the target area A in a case where presence of the foreign matter is determined can contribute to urging of more meticulous attention in comparison with mere display of a message urging the non-presence confirmation of the foreign matter. Because, since a specific state in the target area A is displayed as the image, confirmation within the target area A can be made in a form matching a content of the image. Moreover, if the foreign matter is detected from the image through a program using deep learning, even position and kind of the foreign matter detected in the image are mechanically specified. Then, by displaying the image in the target area A acquired by the image capturing device 9 together with information such as positions and kinds of the specified foreign matters, a confirmer can confirm the inside of the target area A with the kinds, positions and the like of the foreign matters being in mind, which makes it possible to execute more thoroughgoing confirmation and suitable processing for removal of the foreign matters F.

In the embodiment, even when presence of the foreign matter F is determined (in step S4), the operator may confirm non-presence of the foreign matter in the target area A and input non-presence of foreign matter to the operation part 11 (step S10). If the foreign matter F is detected, the system side cannot confirm presence/non-presence of the mechanically detected foreign matter F to remove the same. Thus, a person confirms presence/non-presence of the foreign matter, executes a proper processing as needs demand and then inputs non-presence of the foreign matter to the machine side so that confirmation of non-presence of the foreign matter can be thoroughly executed.

In the embodiment, when presence of the foreign matter F is determined (step S4), operations of devices constituting the system are forbidden (step S11) and after non-presence of the foreign matter is inputted to the operation part 11, the interlock is released in accordance therewith (step S10). In this manner, after the non-presence of the foreign matter is confirmed by the person and correspondingly inputted, the forbidden operation state of the devices is released so that safety can be ensured upon restart of the operations of the devices.

When presence of the foreign matter is determined in plural images acquired by the image capturing devices 9 or when presence of plural foreign matters is determined in one and the same image, attention may be called to the operator to execute steps S7-S10 for each of the images or for each of the objects; for example, employable is a procedure such that an OK button is displayed for each of the objects and after the confirmer makes confirmation in the target area A and inputs the OK button for one of the objects and then an Ok button is displayed together with a next one of the objects.

The procedure of the foreign matter detection as mentioned in the above may be executed at any proper timing. For example, foreign matter detection may be executed when the vehicle 1 is stopped on the pallet 2 and the driver inputs the stoppage thereof to the operation part 11 during the entering of the vehicle. In this case, the confirmation can be done through the visual observation of the target area A by the driver; if the concurrent mechanical foreign matter detection is executed by the foreign matter detection part 14, the confirmation can be thoroughly executed. The foreign matter detection may be executed in any other timing in which inside-state confirmation in the target area A is deemed to be required such as when started exiting instructions are inputted, when the completed exiting is inputted so as to close the entry/exit port 3 or upon a normal condition with no operation being executed. Also conceivable is an operation form such that image acquisition and processing (steps S2 and S3) are executed continuously upon execution of some operation or upon a normal condition and an alarm is issued when a foreign matter is detected.

Figure 7:
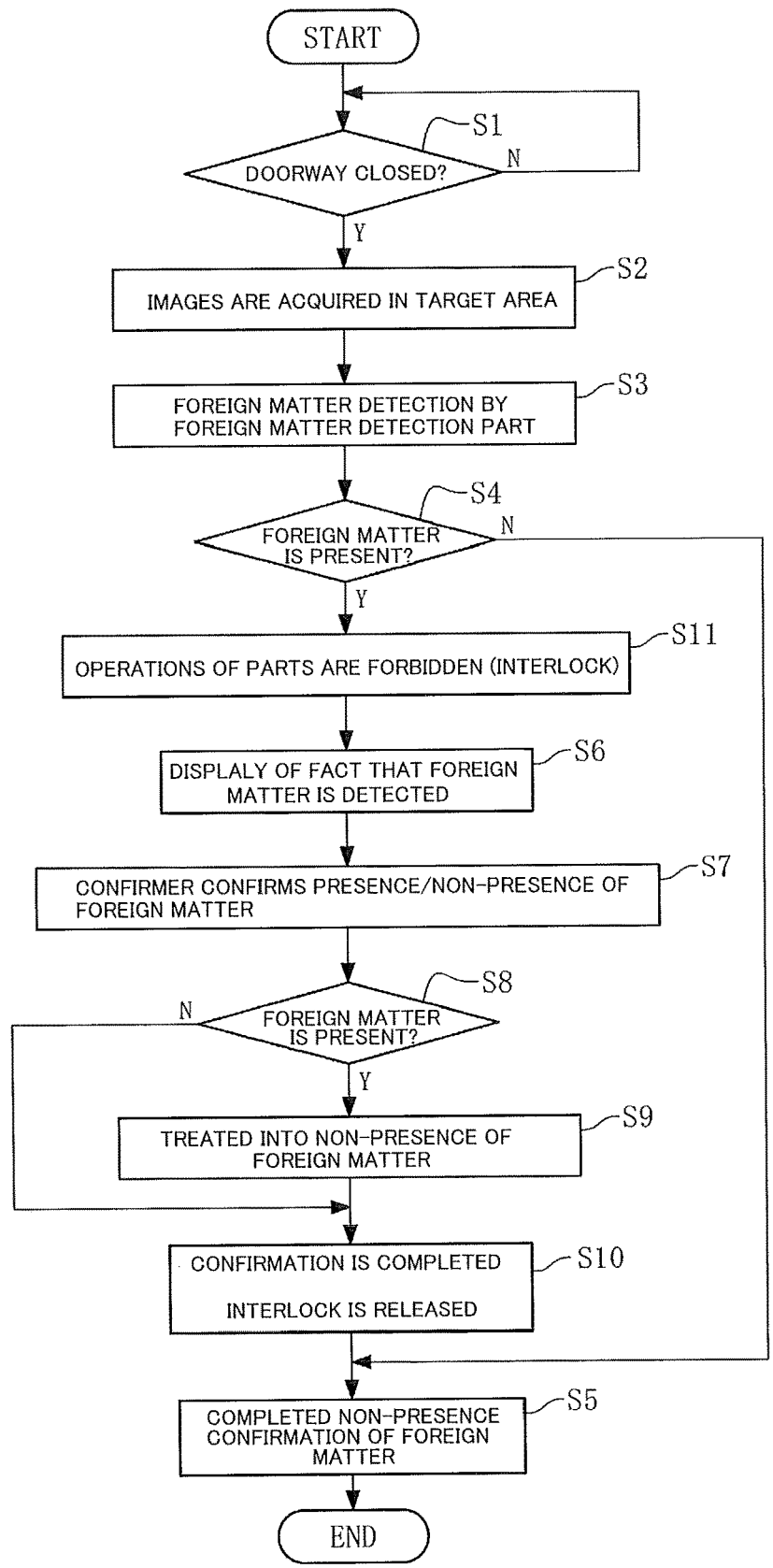
FIG. 7 is a flowchart for explanation of an example of a procedure when foreign matter detection is executed according to the embodiment in the disclosure.

In the prosecution of the foreign matter detection as shown in FIG. 7, any proper construction may be employed as foreign matter detection part 14. Though explained in the embodiment is the case where the foreign matter F is detected on the basis of the images in the target area A acquired by the image capturing devices 9, the construction of the foreign matter detection part 14 is not limited thereto. Any device such as a 3D scanner which can detect a foreign matter F in the target area A may be employed as foreign matter detection part 14, and information of the foreign matter F detected may be displayed on the display part 12 together with the image acquired by the image capturing devices 9.

Features of the foreign matter detection system as shown in the embodiment will be further disclosed in comparison with the above-mentioned Patent Literatures 1-7. First of all, the following are factors for providing a system for detecting a foreign matter F on the basis of an image:

A) To ensure sufficient detection performance, to minimize both false detection and detection omission and to detect even a motionless object.
B) To provide the system with less number of devices and not to provide sensors and the like other than the image capturing devices, if possible.
C) To minimize influences on an appearance of the facility.

Patent Literature 1 discloses a security verification system in which images of a vehicle drive-in room taken by cameras are displayed on a touch-panel-type operation screen so that a user checks safety in the room to push safety check buttons. Displayed on the operation screen are not only image information of the vehicle drive-in room but also detected information by sensors for detection of presence of a person and the like. That is to say, in the technique disclosed in Patent Literature 1, mechanical detection of presence of a foreign matter requires not only images by the cameras but also a plurality of separate sensors, resulting in complexity of system construction. Thus, the above-mentioned condition B is not satisfied.

In the technique disclosed in Patent Literature 2, cameras are provided in a berth for vehicle-entering/exiting in a mechanical parking facility, and pixel data constituting acquired images are sorted into groups. When color change occurs between a pixel data in a position at a certain time and that in the same position at another time, presence of an object is determined. In such a method, temporal change is required for detection of the object; there is a possibility that any stationary foreign matter cannot be detected. That is, the above-mentioned condition A is not satisfied.

In the technique disclosed in Patent Literature 3, lamps are provided in a berth for vehicle-entering/exiting to detect a person or an animal on the basis of whether moving shadow is present or not. A static object cannot be detected and lamps are required, which do not satisfy the above conditions A and B. Moreover, it is also problematic in that light with considerable luminosity is required to be radiated in consideration of influence by solar light and vehicle head lights.

In the technique disclosed in Patent Literature 4, an image in a vehicle drive-in room into which a vehicle is initially entered is compared with an image thereafter; when a changed amount exceeds a set value, a person or an animal is regarded to be present. However, it is assumable that such a method tends to be affected by environmental light such as solar light, headlights of a subsequent vehicle or light radiated by surrounding buildings and the like or noise of cameras, resulting in some overdetection. Moreover, it is necessary to acquire the initial image of the entered vehicle on a proper timing (in a time period from stopping of the vehicle with its headlights being off to the opening of doors of the vehicle), which timing is difficult to be specified from the images of the cameras. Even if the image on a proper timing is obtained as initial image, occupants are present in the vehicle on the timing so that it is assumable that whether the occupants are present or not brings about significant difference in the comparison with the image thereafter. That is, the above-mentioned condition A is not satisfied.

In the technique disclosed in Patent Literature 5, a floor is painted with alternate two colors and a foreign matter is detected as discontinuous color portion in an image acquired by a camera from upward. Such painting of the floor with stripe pattern brings about unsatisfaction with respect to the above-mentioned condition C. Moreover, it is problematic in that troublesome periodic maintenances are required due to contamination of the floor.

In the technique disclosed in Patent Literature 6, persons are detected with images by cameras and an operation of an operation board is forbidden when a number of persons getting out of a vehicle does not coincide with a number of persons getting out of the area. However, the persons getting out of the vehicle generally pay attention to their feet so that it seems difficult to acquire images for mechanical identification of faces of the persons getting out of the vehicle by the cameras, which does not satisfy the above-mentioned condition A. Moreover, complicate computation is required since face identification and matching is executed for each time a person or persons get into and out of the vehicle and the area.

Patent Literature 7 discloses a system for remote-monitoring unmanned parking facility. Confirmation of a foreign matter is executed visually by a user or through an image of a CCD camera by an outmost operator, which does not satisfy the above-mentioned condition A.

By contrast, in the foreign matter detection system as in the embodiment, weaknesses in the techniques disclosed in the above-mentioned Patent Literatures can be overcome by the system for detecting specific kinds of foreign matters through images. That is, detection can be made even in a case of static foreign matters, the detection is hardly affected by change in light conditions due to environment light and the like and acquirement of a standard image is not required. Physical masking of transmission parts (the doorway 7 and window 8) by polarizing filters 10 can suppress false detection without complicate computation such as in/out determination and does not affect visibility by bare eyes through the transmission parts. Moreover, at minimum, the image capturing devices 9 will suffice as devices installed in the target area A, which slightly affects the designing aspect.

Though the entry/exit space in the mechanical parking facility is assumed in the embodiment as the target area A, a similar foreign matter detection system may be employed irrespective of a kind of the target area, providing that the target area is a space with transmission parts between the same and an exterior space. Assumable is, for example, a power feeding facility for electric-powered vehicles; other than the vehicle-handling space, the embodiment may be applied for safety or guard in some space.

For example, in a productive facility using robots, an operative area for robot arms may be surrounded by transparent acrylic plates and the like. The embodiment is applicable in such location such that, for safety of the operative area, cameras are installed in the area and polarizing filters are arranged for the cameras and on the acrylic plates so that foreign matter detection is executed on the basis of images by the cameras while visual observation from outside is possible through the acrylic plates. Alternatively, conceivable is an application such that, upon monitoring inside of an elevator with transparent walls, polarizing filters are provided for cameras and on the walls to prevent false detection.

As is clear from the foregoing, a foreign matter detection system according to the above-mentioned embodiment comprises an image capturing device 9 for acquiring an image in the target area A, transmission parts 7 and 8 through which outside can be visually observed from inside of the target area A and front- and depth-side polarizing filters 10a and 10b relative to the image capturing device 9, the polarizing filters being provided on a light path from the transmission parts 7 and 8 to the image capturing device 9 so as to have polarizing directions crossing each other, whereby a foreign matter in the target area A is detected on the basis of the image acquired by the image capturing device 9. In this way, without affecting the visuality through the transmission parts 7 and 8 by bare eyes, light from the outer space is masked by the depth-side polarizing filter 10b while the image of the front-side object can be acquired. Execution of the foreign matter detection using the foreign matter detection part 14 on the basis of the image acquired can make it possible to determine presence/non-presence of the foreign matter F with higher accuracy without detection omission or overdetection.

In the above-mentioned foreign matter detection system, the depth-side polarizing filter 10b is arranged on the transmission parts 7 and 8 on a border between the target area A and an outside space, which simplifies arrangement of the depth-side polarizing filter 10b.

In the above-mentioned foreign matter detection system, the foreign matter F in the image acquired by the image capturing device 9 is detected by a program using deep learning, which makes it possible to optimally execute the foreign matter detection in the system for foreign matter detection through the deep learning.

In the above-mentioned foreign matter detection system, the target area A may be an entry/exit space in a mechanical parking facility, which makes it possible to optimally execute the foreign matter detection in the entry/exit space in the mechanical parking facility.

Further, the foreign matter detection system according to the above-mentioned embodiment comprises an image capturing device 9 for acquiring an image in a target area A, a display part 12 for display of the image acquired by the image capturing device 9, an operation part 11 for input of operations of parts constituting the system and a foreign matter detection part 14 for detection of a foreign matter F in the target area A, whereby the image acquired by the image capturing device 9 is displayed on the display part 12 together with information on the foreign matter F detected when presence of the foreign matter F is determined by the foreign matter detection part 14. Then, confirmation of inside of the target area A by manpower with a kind, a position and the like of the foreign matter F being in mind makes it possible to execute thoroughgoing confirmation and proper processing for removal of the foreign matter F.

In the above-mentioned foreign matter detection system, an operator may confirm non-presence of the foreign matter F in the target area A to input the non-presence of the foreign matter F to the operation part 11 when presence of the foreign matter F is determined by the foreign matter detection part 14. By doing so, the non-presence of the foreign matter can be thoroughly confirmed.

In the above-mentioned foreign matter detection system, operations of devices constituting the system may be forbidden when the presence of the foreign matter F is determined by the foreign matter detection part 14 and thereafter a forbidden operation state of the devices constituting the system is released when the non-presence of the foreign matter is inputted to the operation part 11. By doing so, safety can be ensured for movements of the devices.

Thus, according to the above-mentioned embodiment, a foreign matter can be detected with high accuracy by extremely simple construction.

It is to be understood that a foreign matter detection system explained in the disclosure is not limited to the above embodiment and that various changes and modifications may be made without departing from the scope of the disclosure.

REFERENCE SIGNS LIST 1 vehicle
2 pallet
3 entry/exit port
5 conveying device
6 guide mirror
7 transmission part (doorway)
8 transmission part (window)
9 image capturing device
9a image capturing device
9b image capturing device
9c image capturing device
10 polarizing filter
10a polarizing filter (front-side polarizing filter)
10b polarizing filter (depth-side polarizing filter)
11 operation part
12 display part
13 controller
14 foreign matter detection part
A target area
F object (foreign matter)
O object

The invention claimed is:

1. A foreign matter detection system comprising
a first and image capturing device for acquiring a first image in a target area, wherein the first image capturing device has a first field of view,
a second image capturing device for acquiring a second image in the target area, wherein the second image capturing device has a second field of view, wherein the second field of view is different than the first field of view,
a transmission part arranged within the first and second fields of view of the first and second capturing devices, and through the transmission part a space outside of the target area can be visually observed from inside of the target area,
an entry/exit port for entering/exiting the target area, the entry/exit port being arranged on a position different from a position of the transmission part,
a first polarizing filter provided on a first light path from the transmission part to the first capturing device, and a second polarizing filter provided on a second light path from the transmission part to the second image capturing device, a third polarizing filter provided on the first light path from the transmission part to the first capturing device and on the second light path from the transmission part to the second image capturing device, wherein the first and third polarizing filters have polarizing directions crossing each other to thereby mask light from the transmission part to the first image capturing device, and the second and third polarizing filters have polarizing directions crossing each other to thereby mask light from the transmission part to the second image capturing device, and a foreign matter detection part for detecting foreign matter in the target area on the basis of the first and second images acquired by the first and second image capturing devices, wherein the entry/exit port is on edges of the first and second fields of view, and the first and second image capturing devices are arranged so that the entry/exit port is present at edges of the acquired first and second images.

2. The foreign matter detection system as claimed in claim 1, wherein the third polarizing filter is provided on the transmission part positioned on a border between the target area and the space outside of the target area.

3. The foreign matter detection system as claimed in claim 1, wherein the foreign matter in the first and second images acquired by the first and second image capturing devices is detected by a program using deep learning.

4. The foreign matter detection system as claimed in claim 2, wherein the foreign matter in the first and second images acquired by the first and second image capturing devices is detected by a program using deep learning.

5. The foreign matter detection system as claimed in claim 1, wherein the target area is an entry/exit space in a mechanical parking facility.

6. The foreign matter detection system as claimed in claim 2, wherein the target area is an entry/exit space in a mechanical parking facility.

7. The foreign matter detection system as claimed in claim 3, wherein the target area is an entry/exit space in a mechanical parking facility.

8. The foreign matter detection system as claimed in claim 4, wherein the target area is an entry/exit space in a mechanical parking facility.

9. The foreign matter detection system as claimed in claim 1, wherein the transmission part is a window or a door.

10. The foreign matter detection system as claimed in claim 2, wherein the first polarizing filter is provided in front of the first image capturing device, and the second polarizing filter is provided in front of the second image capturing device.

11. The foreign matter detection system as claimed in claim 1, wherein
the first polarizing filter is closer to the first image capturing device on the first light path from the transmission part to the first image capturing device than the third polarizing filter.

* * * * *

UNITED STATES PATENT AND TRADEMARK OFFICE
CERTIFICATE OF CORRECTION

| | | |
|---|---|---|
| PATENT NO. | : 12,254,695 B2 | Page 1 of 1 |
| APPLICATION NO. | : 17/528850 | |
| DATED | : March 18, 2025 | |
| INVENTOR(S) | : Kenichi Hamaguchi et al. | |

It is certified that error appears in the above-identified patent and that said Letters Patent is hereby corrected as shown below:

In the Claims

Column 16, Line 50, Claim 1, delete "and";

Column 16, Line 67, Claim 1, "the transmission part to the first capturing" should be -- the transmission part to the first image capturing --;

Column 17, Line 5, Claim 1, "from the transmission part to the first capturing" should be -- from the transmission part to the first image capturing --.

Signed and Sealed this
Eighth Day of July, 2025

Coke Morgan Stewart
*Acting Director of the United States Patent and Trademark Office*